US012608930B2

(12) United States Patent
Rakshit et al.

(10) Patent No.: US 12,608,930 B2
(45) Date of Patent: Apr. 21, 2026

(54) LEO SATELLITE-BASED FOREST FIRE PREDICTION AND MITIGATION

(71) Applicant: INTERNATIONAL BUSINESS MACHINES CORPORATION, Armonk, NY (US)

(72) Inventors: Sarbajit K. Rakshit, Kolkata (IN); Subha Basu, Howrah (IN); Sourav Banerjee, Konnagar (IN); Shaik Mohammed Gouse Basha, Lansdale, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 407 days.

(21) Appl. No.: 18/357,667

(22) Filed: Jul. 24, 2023

(65) Prior Publication Data
US 2025/0037451 A1 Jan. 30, 2025

(51) Int. Cl.
*G06V 20/13* (2022.01)
*A62C 3/02* (2006.01)
(Continued)

(52) U.S. Cl.
CPC ............ *G06V 20/13* (2022.01); *A62C 3/0278* (2013.01); *G01W 1/10* (2013.01); *G06T 11/26* (2026.01);
(Continued)

(58) Field of Classification Search
CPC ........ G06V 20/13; G06V 10/22; H04N 23/69; H04N 23/815; A62C 3/0278; G01W 1/10; G06T 11/206
(Continued)

(56) References Cited

U.S. PATENT DOCUMENTS 5,357,865 A * 10/1994 Mather .................. A01G 15/00
252/194
6,364,026 B1 * 4/2002 Doshay ................ G08B 17/005
169/56
(Continued)

FOREIGN PATENT DOCUMENTS

CN 108939349 B 12/2020
CN 113218508 7/2022
EP 2689809 B1 3/2019

OTHER PUBLICATIONS

Department of Forestry and Natural Resources, "Wildfires", https://forestry.ca.uky.edu/wildfire, Accessed on Apr. 27, 2023, 4 Pages.
(Continued)

*Primary Examiner* — Chee-Chong Lee
(74) *Attorney, Agent, or Firm* — Robert R. Aragona

(57) ABSTRACT

An embodiment for predicting and mitigating forest fires based on low earth orbit (LEO) satellites is provided. The embodiment may include receiving historical LEO satellite images of a forested region. The embodiment may also include identifying a geographical area and a boundary of the geographical area. The embodiment may further include identifying a time range of a fire season in the geographical area. The embodiment may also include in response to determining at least one LEO satellite is not positioned within the boundary of the geographical area during the time range, adapting a location of the at least one LEO satellite to be within the boundary during the time range. The embodiment may further include capturing live LEO satellite images of inflammable material in the geographical area. The embodiment may also include identifying a range of changes in the inflammable material.

20 Claims, 4 Drawing Sheets

(51) Int. Cl.

| | |
|---|---|
| *G01W 1/10* | (2006.01) |
| *G06T 11/26* | (2026.01) |
| *G06V 10/22* | (2022.01) |
| *H04N 23/69* | (2023.01) |
| *H04N 23/80* | (2023.01) |

(52) U.S. Cl.
CPC ............. *G06V 10/22* (2022.01); *H04N 23/69* (2023.01); *H04N 23/815* (2023.01)

(58) Field of Classification Search
USPC ........................................................ 169/54
See application file for complete search history.

(56) References Cited

U.S. PATENT DOCUMENTS

| | | | | |
|---|---|---|---|---|
| 7,909,111 | B1 * | 3/2011 | Hinojosa | A62C 3/0214 |
| | | | | 239/69 |
| 8,165,731 | B2 * | 4/2012 | Akcasu | A62C 3/025 |
| | | | | 701/25 |
| 9,833,647 | B2 | 12/2017 | Kawiecki | |
| 12,235,408 | B2 * | 2/2025 | Smalley | G01J 5/0014 |
| 2004/0069505 | A1 * | 4/2004 | Griffin | A62C 2/00 |
| | | | | 169/46 |
| 2005/0001729 | A1 * | 1/2005 | Garmer | G01J 1/0219 |
| | | | | 340/600 |
| 2012/0261144 | A1 | 10/2012 | Lyle | |
| 2022/0016455 | A1 | 1/2022 | Tohidi | |

OTHER PUBLICATIONS

Dri, "Cloud Seeding Program", https://www.dri.edu/cloud-seeding-program/what-is-cloud-seeding/, Accessed on Apr. 27, 2023, 5 Pages.

Gutro, "Nasa Covers Wildfires Using Many Sources", https://www.nasa.gov/mission_pages/fires/main/missions/ index.html, Accessed on Apr. 27, 2023, 8 Pages.

Johnston, et al., "Satellite Detection Limitations of Sub-Canopy Smouldering Wildfires in the North American Boreal Forest", Fire, MDPI, https://www.mdpi.com/2571-6255/Jan. 2, 28, Aug. 10, 2018, 16 Pages.

Maden, et al., "Satellite Data Aids Forest Fire Detection and Monitoring in Nepal", NASA, Accessed on Apr. 27, 2023, 7 Pages. https://appliedsciences.nasa.gov/our-impact/story/satellite-data-aids-forest-fire-detection-and-monitoring-nepal.

Seaturtle, "Satellite Tags", http://www.seaturtle.org/tagging/satellite.shtml, Accessed on Jul. 24, 2023, 9 Pages.

Wijayatunga, et al., "An Optimised Satellite Constellation for Forest Fire Detection Through Edge Computing", arXiv:2209.07038v1 [math.OC] , Sep. 15, 2022, 26 Pages.

* cited by examiner

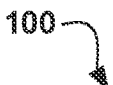

100

COMPUTER 101

PROCESSOR SET 110

| PROCESSING CIRCUITRY 120 | CACHE 121 |
|---|---|

COMMUNICATION FABRIC 111

VOLATILE MEMORY 112

PERSISTENT STORAGE 113

OPERATING SYSTEM 122

FIRE MITIGATION PROGRAM 150

PERIPHERAL DEVICE SET 114

| UI DEVICE SET 123 | STORAGE 124 | IoT SENSOR SET 125 |
|---|---|---|

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
|---|---|
| VIRTUAL MACHINE SET 143 | CONTAINER SET 144 |

FIG. 1

200
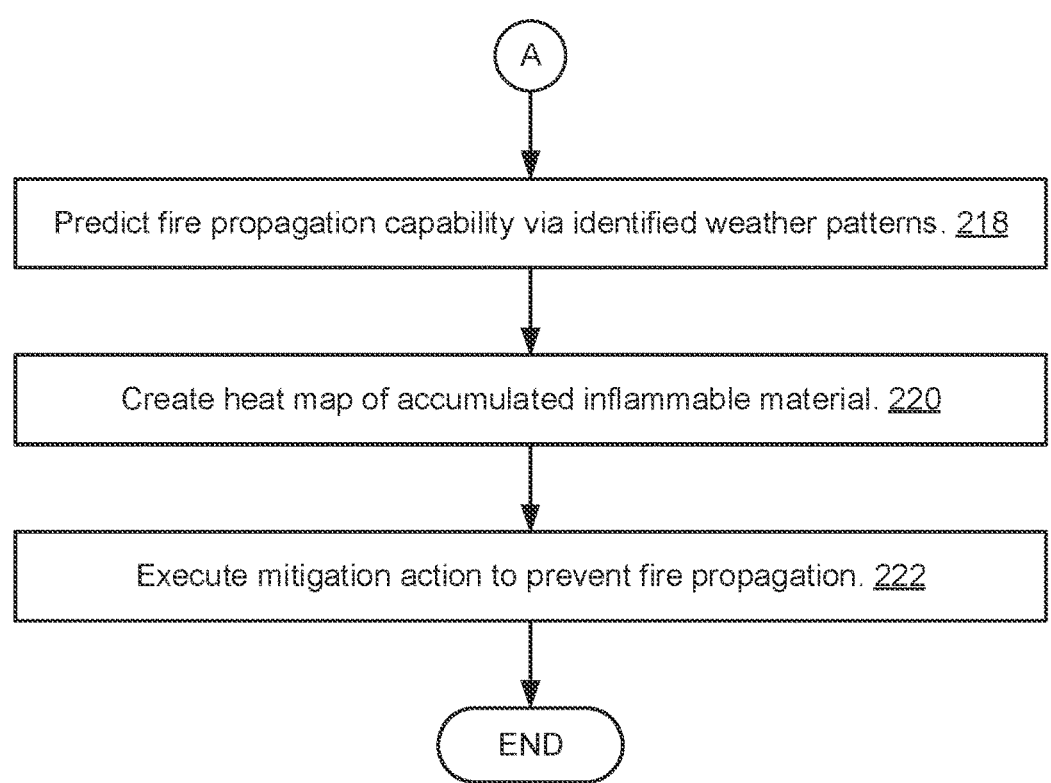
Predict fire propagation capability via identified weather patterns. 218
Create heat map of accumulated inflammable material. 220
Execute mitigation action to prevent fire propagation. 222
END
FIG. 2B

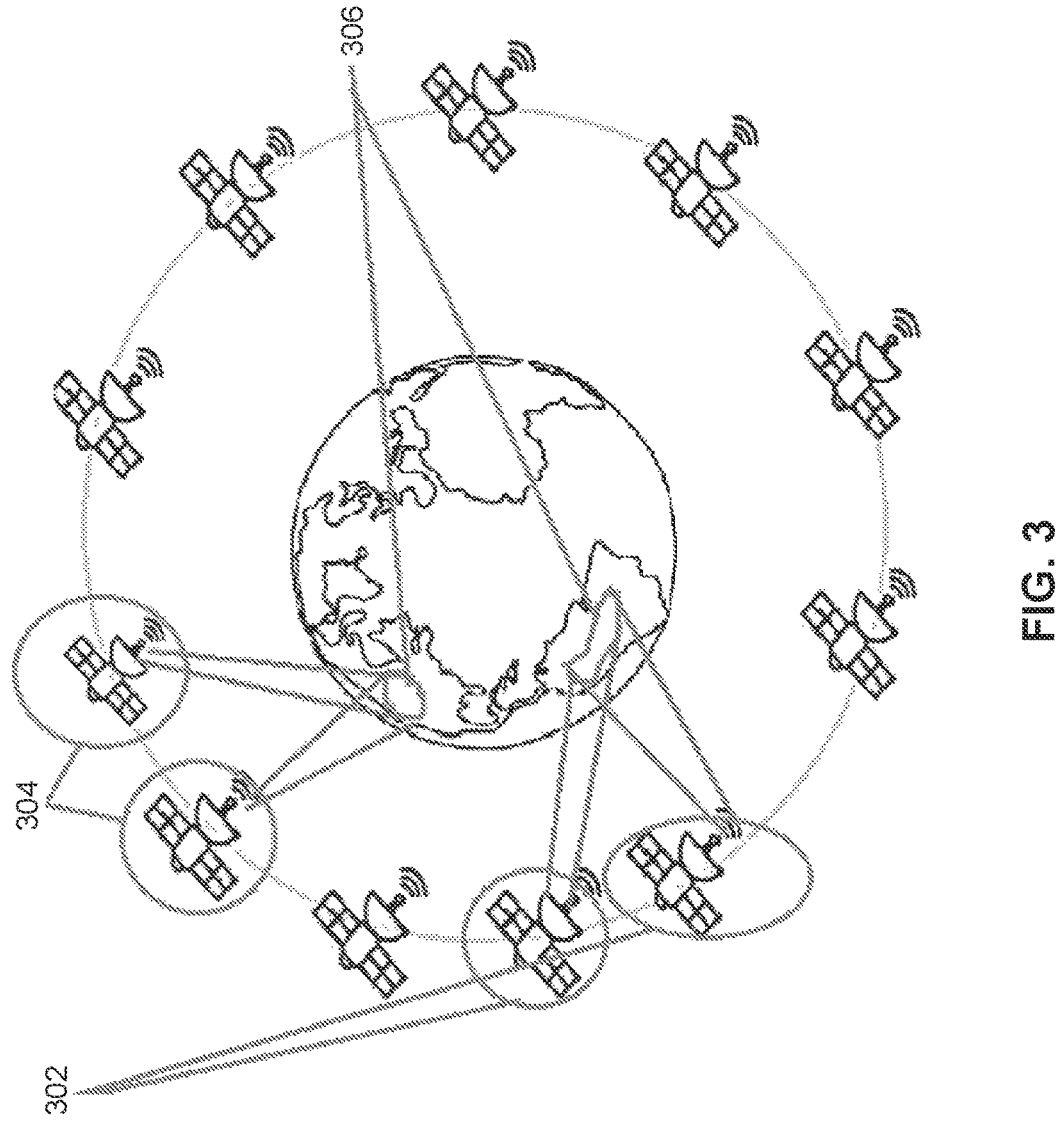
306
304
302
300
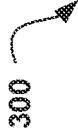
FIG. 3

LEO SATELLITE-BASED FOREST FIRE PREDICTION AND MITIGATION

BACKGROUND

The present invention relates generally to the field of computing, and more particularly to a system for predicting and mitigating forest fires based on low earth orbit (LEO) satellites.

Dry leaves that have fallen on the ground in forested areas may play a large role in propagating forest fires. Fire damage may be seen on many trees that have been affected by forest fires in years past. Many of these affected trees have large openings where the fire has made an entrance and insects, disease, and rot and rot have continued years after the fire. Conditions such as warm temperatures and low humidity may also be conducive to the propagation of forest fires. Forest fires may be caused naturally (e.g., by a lightning strike) and/or artificially by humans (e.g., by an open campfire flame). Thus, forest fires may be broadly classified into three categories: natural forest fires; forest fires caused by heat generated in litter; and forest fires deliberately caused by local inhabitants.

SUMMARY

According to one embodiment, a method, computer system, and computer program product for predicting and mitigating forest fires based on low earth orbit (LEO) satellites is provided. The embodiment may include receiving historical LEO satellite images of a forested region. The embodiment may also include identifying a geographical area and a boundary of the geographical area based on the historical LEO satellite images. The embodiment may further include identifying a time range of a fire season in the geographical area. The embodiment may also include in response to determining at least one LEO satellite is not positioned within the boundary of the geographical area during the time range, adapting a location of the at least one LEO satellite to be within the boundary during the time range. The embodiment may further include capturing live LEO satellite images of inflammable material in the geographical area. The embodiment may also include identifying a range of changes in the inflammable material by comparing the live LEO satellite images and the historical LEO satellite images.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary computing environment according to at least one embodiment.

FIGS. 2A and 2B illustrate an operational flowchart for predicting and mitigating forest fires based on low earth orbit (LEO) satellites in a forest fire prediction and mitigation process according to at least one embodiment.

FIG. 3 is an exemplary diagram depicting LEO satellites capturing images of a geographical area according to at least one embodiment.

DETAILED DESCRIPTION

Figure 2A:
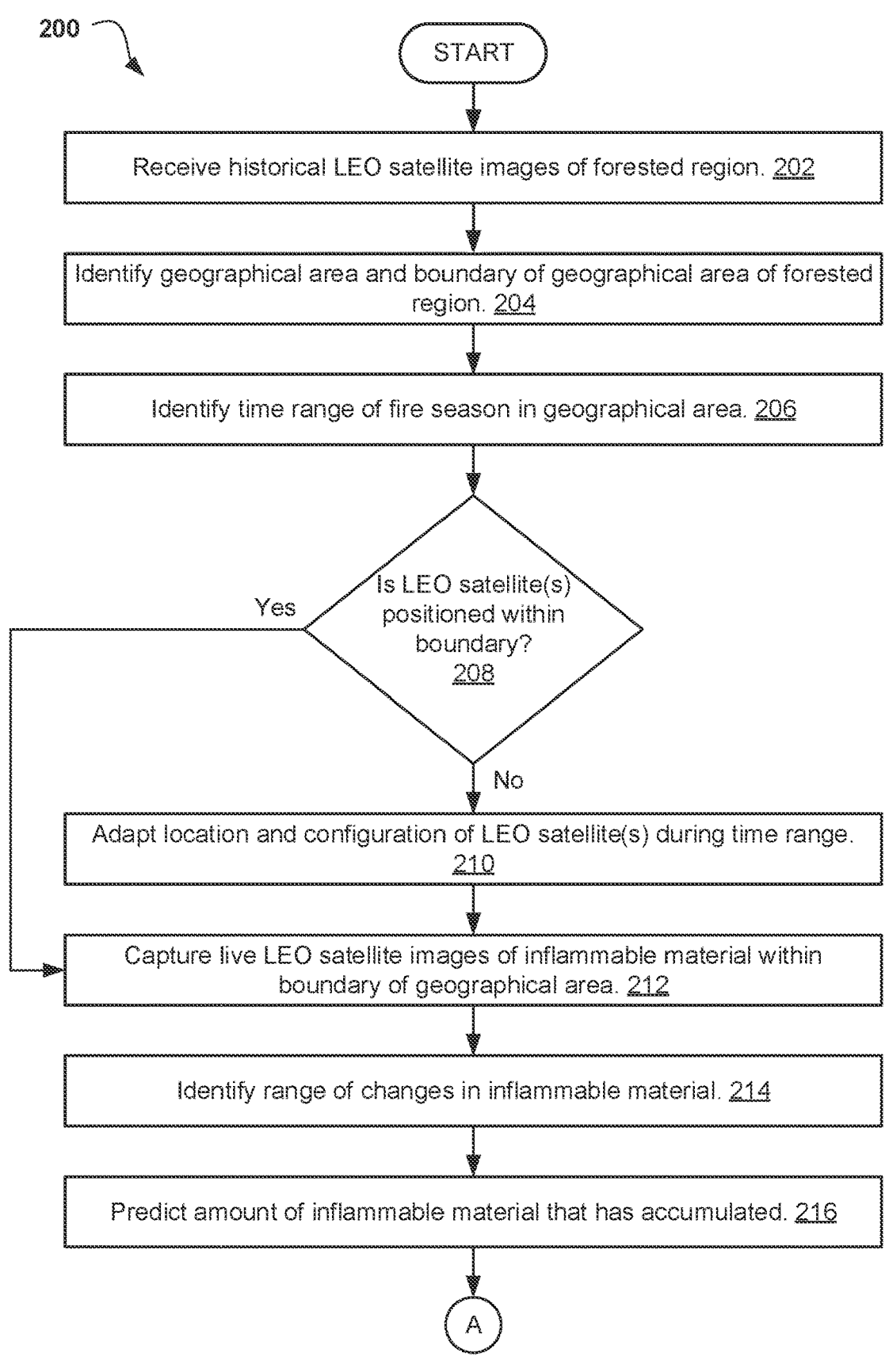

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for predicting and mitigating forest fires based on low earth orbit (LEO) satellites. The following described exemplary embodiments provide a system, method, and program product to, among other things, adapt a location and configuration of LEO satellites during an identified time range and, accordingly, execute a mitigation action to prevent fire propagation. Therefore, the present embodiment has the capacity to improve satellite monitoring technology by predicting a precise location of a potential forest fire and required actions.

As previously described, dry leaves that have fallen on the ground in forested areas may play a large role in propagating forest fires. Fire damage may be seen on many trees that have been affected by forest fires in years past. Many of these affected trees have large openings where the fire has made an entrance and insects, disease, and rot and rot have continued years after the fire. Conditions such as warm temperatures and low humidity may also be conducive to the propagation of forest fires. Forest fires may be caused naturally (e.g., by a lightning strike) and/or artificially by humans (e.g., by an open campfire flame). Thus, forest fires may be broadly classified into three categories: natural forest fires; forest fires caused by heat generated in litter; and forest fires deliberately caused by local inhabitants. It is often difficult to identify a potential area in a forest where fires may spread more quickly. This problem is typically addressed by using an aerial vehicle to identify the accumulation of leaves. However, use of the aerial vehicle fails to predict which portion of a large area is to be monitored and when.

It may therefore be imperative to have a system in place to identify an area where accumulation of inflammable material will be greater. Thus, embodiments of the present invention may provide advantages including, but not limited to, predicting a precise location of a potential forest fire and required actions, identifying an area where accumulation of inflammable material will be greater, and proactively identifying appropriate actions. The present invention does not require that all advantages need to be incorporated into every embodiment of the invention.

According to at least one embodiment, when predicting forest fires, historical LEO satellite images of a forested region may be received in order to identify a geographical area and a boundary of the geographical area based on the historical LEO satellite images. Upon receiving the historical LEO satellite images, a time range of a fire season in the geographical area may be identified so that it may be determined whether at least one LEO satellite is positioned within the boundary of the geographical area during the time range. According to at least one embodiment, in response to determining the at least one LEO satellite is not positioned within the boundary of the geographical area during the time range, a location of the at least one LEO satellite may be adapted to be within the boundary during the time range. Then, live LEO satellite images of inflammable material in the geographical area may be captured such that a range of changes in the inflammable material may be identified by comparing the live LEO satellite images and the historical LEO satellite images.

According to at least one other embodiment, upon identifying the range of changes, an amount of the inflammable material that has accumulated in the geographical area may be predicted based on the comparison of the live LEO satellite images and the historical LEO satellite images in order to predict a fire propagation capability based on identified weather patterns in the geographical area during the time range. Then, a heat map of the accumulated inflammable material may be created so that one or more mitigation actions to prevent fire propagation may be executed.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to adapt a location and configuration of LEO satellites during an identified time range and, accordingly, execute a mitigation action to prevent fire propagation.

Referring to FIG. 1, an exemplary computing environment 100 is depicted, according to at least one embodiment. Computing environment 100 contains an example of an environment for the execution of at least some of the computer code involved in performing the inventive methods, such as a fire mitigation program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may also include a LEO satellite, a robotic device, an unmanned aerial vehicle (UAV), and/or any other device for removing accumulated debris.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the fire mitigation program 150 may be a program capable of receiving historical LEO satellite images of a forested region, adapting a location and configuration of LEO satellites during an identified time range, executing a mitigation action to prevent fire propagation, predicting a precise location of a potential forest fire and required actions, identifying an area where accumulation of inflammable material will be greater, and proactively identifying appropriate actions. Furthermore, notwithstanding depiction in computer 101, the fire mitigation program 150 may be stored in and/or executed by, individually or in any combination, end user device 103, remote server 104, public cloud 105, and private cloud 106. The fire mitigation method is explained in further detail below with respect to FIGS. 2A and 2B. It may be appreciated that the examples described below are not intended to be limiting, and that in embodiments of the present invention the parameters used in the examples may be different.

Referring now to FIGS. 2A and 2B, an operational flowchart for predicting and mitigating forest fires based on LEO satellites in a forest fire prediction and mitigation process 200 is depicted according to at least one embodiment. At 202, the fire mitigation program 150 receives the historical LEO satellite images of the forested region. The forested region may be a region having an abundance of trees and/or other plant life with a sparse population of human inhabitants. The historical LEO satellite images may include images captured by one or more LEO satellites at some point in the past. For example, the historical LEO satellite images may have been captured three months ago.

Then, at 204, the fire mitigation program 150 identifies the geographical area and the boundary of the geographical area. The geographical area and boundary are identified based on the historical LEO satellite images. The geographical area may be a precise location of a vast swath of land that includes one or more forested regions. For example, the geographical area may include a portion of the province of Ontario, Canada. When the historical LEO satellite images are captured, the images may be tagged with metadata indicating the geographical area where the images were captured. The metadata may also indicate the boundary of any given geographical area. The boundary of the geographical area may be the edges of the geographical area. For example, the boundary of the geographical area may be a location where a forested region meets a city, town, and/or village having a larger human population.

Next, at 206, the fire mitigation program 150 identifies the time range of the fire season in the geographical area. The time range of the fire season may be a time period during which the chance of fire propagation is greater due to the accumulation of inflammable material on the ground in the geographical area. Examples of inflammable material may include, but are not limited to, leaves, brush, branches, chemicals, and/or litter (e.g., plastic cups and wrappers). For example, in the northern hemisphere, the time range of the fire season may be from October through December. Continuing the example, these months may include conditions conducive to the propagation of forest fires, such as low humidity and leaves on the ground. According to at least one embodiment, the time range may be identified based on a leaf shedding timeline. The leaf shedding timeline may be a duration from beginning to end of leaves falling from trees in the geographical area. The leaf shedding timeline may be predicted from the historical LEO satellite images.

Then, at 208, the fire mitigation program 150 determines whether the at least one LEO satellite is positioned within the boundary of the geographical area during the time range. As used herein, a "LEO satellite" means a satellite that is monitoring the environment and/or weather conditions. The position of each LEO satellite may be tracked from ground stations using mechanisms including, but not limited to, radar, signal doppler, and/or laser reflectors to pinpoint the precise location of each LEO satellite.

For example, the geographical area may be the portion of the province of Ontario, Canada and the time range may be October through December. When the at least one LEO satellite is determined to be directly over Ontario on October 30$^{th}$, the fire mitigation program 150 may determine the at least one LEO satellite is positioned within the boundary of the geographical area during the time range.

In response to determining the at least one LEO satellite is not positioned within the boundary of the geographical area during the time range (step 208, "No" branch), the forest fire prediction and mitigation process 200 proceeds to step 210 to adapt the location of the at least one LEO satellite to be within the boundary during the time range. In response to determining the at least one LEO satellite is positioned within the boundary of the geographical area during the time range (step 208, "Yes" branch), the forest fire prediction and mitigation process 200 proceeds to step 212 to capture the live LEO satellite images of the inflammable material in the geographical area.

Next, at 210, the fire mitigation program 150 adapts the location of the at least one LEO satellite. The location is adapted to be within the boundary of the geographical area during the time range. The fire mitigation program 150 may send a request to a cloud server to change the location of the at least one LEO satellite, such as public cloud 105 or private cloud 106. In response to the request, the cloud server may identify each LEO satellite and the real-time position of each LEO satellite.

According to at least one embodiment, the request may be to adapt the location of one or more LEO satellites within a pre-defined distance of the geographical area. For example, the location of one or more LEO satellites within 100 miles of the geographical area may be adapted to be within the boundary of the geographical area during the time range. In this manner, LEO satellite resources monitoring other parts of the world may not be impacted.

According to at least one other embodiment, adapting the location of the at least one LEO satellite to be within the boundary during the time range may include adapting a configuration of the at least one LEO satellite. Examples of the configuration may include, but are not limited to, a zoom level and/or a resolution of a camera of the at least one LEO satellite. For example, the zoom level and resolution of the camera of the at least one LEO satellite may be directly proportional to the distance between the at least one LEO satellite and the geographical area. Continuing the example, a greater distance between the at least one LEO satellite and the geographical area may result in a higher zoom level and resolution.

Then, at 212, the fire mitigation program 150 captures the live LEO satellite images of the inflammable material in the geographical area. According to at least one embodiment, where the at least one LEO satellite is not positioned within the boundary of the geographical area during the time range, the at least one LEO satellite that has been relocated to be within the boundary during the time range may capture the live LEO satellite images of the inflammable material. According to at least one other embodiment, where the at least one LEO satellite is already positioned within the boundary of the geographical area during the time range, the at least one LEO satellite that is already positioned may capture the live LEO satellite images of the inflammable material. In either embodiment, the live LEO satellite images of the inflammable material may be captured consistent with the adapted configuration of the at least one LEO satellite described above with respect to step 210. For example, where the adapted configuration of the zoom level is changed from 10× to 100×, the live LEO satellite images of the inflammable material may be captured at a zoom level of 100×.

As described above with respect to step 206, examples of the inflammable material may include, but are not limited to, leaves, brush, branches, chemicals, and/or litter (e.g., plastic cups and wrappers). Thus, the captured live LEO satellite images may include images of the leaves, brush, branches, chemicals, and/or litter.

Next, at 214, the fire mitigation program 150 identifies the range of changes in the inflammable material. The range of changes in the inflammable material are identified by comparing the live LEO satellite images and the historical LEO satellite images. As used herein, a "range of changes" means changes in the images of the geographical area from one time period to another. For example, the range of changes may include changes in the images of the geographical area between the summer and fall seasons.

According to at least one embodiment, the at least one LEO satellite currently positioned within the boundary of the geographical area may perform edge computation of the historical LEO satellite images and the live LEO satellite images. For example, the edge computation may evaluate the rate at which the density of leaves on trees and shrubs is increasing and/or decreasing from one time period to another as well as the color of the leaves. Continuing the example, the edge computation may determine that the leaves are falling and changing colors between September and December. In another example, the edge computation may evaluate the change in the amount of chemicals and/or litter in the geographic area from one time period to another. Continuing the example, the edge computation may determine that the amount of chemicals and litter has increased between September and December.

According to at least one other embodiment, the live LEO satellite images and the historical LEO satellite images may be fed into a convolutional neural network (CNN). The live LEO satellite images may include images of the geographical area during the current weather season (e.g., fall). The historical LEO satellite images may include images of the geographical area during the three other weather seasons (e.g., spring, summer, and winter). The live LEO satellite images of the current weather season may be pooled together into a single layer and the historical LEO satellite images of each of the other three seasons may also be pooled together into a single layer. In this manner, four pooled layers may be created (i.e., one for each weather season). The pooled layers may be utilized by the fire mitigation program 150 to recognize the objects (e.g., inflammable materials) in the live LEO satellite images and the historical LEO satellite images and how those objects are changing from one time period to another.

Then, at 216, the fire mitigation program 150 predicts the amount of the inflammable material that has accumulated in the geographical area. The prediction may be made based on the comparison of the live LEO satellite images and the historical LEO satellite images. The range of changes described above with respect to step 214 from one time period to another may be used to estimate the rate at which the inflammable material is increasing and/or decreasing from one time period to another. Thus, the rate at which the inflammable material is increasing and/or decreasing from one time period to another may be used to predict the amount of the inflammable material that has accumulated.

For example, the rate at which the density of leaves on trees and shrubs is decreasing from one time period to another and the color of the leaves may be used to predict the amount of leaves have accumulated in the geographical area.

According to at least one embodiment, the amount of the inflammable material that has accumulated may be compared with a threshold limit. For example, a threshold limit for the amount of leaves that have accumulated may be two tons. When the amount of the inflammable material that has accumulated crosses the threshold limit, the one or more mitigation actions may be executed to prevent fire propagation, described in further detail below with respect to step 222.

Next, at 218, the fire mitigation program 150 predicts the fire propagation capability. The fire propagation capability is predicted based on identified weather patterns in the geographical area during the time range. The fire propagation capability may also be predicted based on the amount of the inflammable material that has accumulated. The more the inflammable material has accumulated, the greater the fire propagation capability.

According to at least one embodiment, LEO satellites monitoring the environment may interact with LEO satellites monitoring weather conditions to identify weather patterns in the geographical area during the time range. Examples of weather patterns may include, but are not limited to, rain, snow, sleet, hail, and/or wind speed and direction. For example, a geographical area having an abundance of rain during the time range may have a lower risk of fire propagation than another geographical area having little to no rain during the time range. The identified weather patterns may also affect the inflammable material itself, such as increasing or decreasing the rate of decomposition of the inflammable material. For example, a faster decomposition of leaves may reduce the risk of fire propagation in the geographical area.

According to at least one other embodiment, predicting the fire propagation capability based on the identified weather patterns in the geographical area during the time range may include estimating a wind speed and direction in the geographical area during the time range. A direction of fire propagation may then be predicted based on the estimated wind speed and direction. For example, where the winds blow towards the west in the geographical area during the time range, the direction of fire propagation may also be towards the west.

Then, at 220, the fire mitigation program 150 creates the heat map of the accumulated inflammable material. The heat map may be a graphical representation of the accumulated inflammable material where the amount of inflammable material that has accumulated is depicted by color. For example, the amount of inflammable material may be depicted by a color spectrum from blue (indicating a lowest amount) to red (indicating a highest amount). The heat map may thus illustrate one or more sections of the geographical area where fires may propagate more quickly.

Next, at 222, the fire mitigation program 150 executes the one or more mitigation actions to prevent fire propagation.

According to at least one embodiment, the executed one or more mitigation actions may include deploying a robotic device to remove the accumulated inflammable material. The fire mitigation program 150 may control the robotic device on the ground to remove any inflammable material that has accumulated. The accumulated inflammable material may be removed in accordance with a sequence based on the heat map described above with respect to step 220. In particular, the robotic device may be deployed to remove the inflammable material in descending order from a portion of the geographical area having greatest accumulation to a portion of the geographical area having least accumulation based on the heat map. In this manner, the portions of the geographical area having the greatest accumulation of inflammable material, and thus the highest fire propagation capability, may be prioritized.

According to at least one other embodiment, the executed one or more mitigation actions may include identifying an aerial location within the boundary of the geographical area where cloud seeding is to be performed based on the heat map. Similar to the embodiment described above, the cloud seeding may be performed in descending order from the portion of the geographical area having greatest accumulation to the portion of the geographical area having least accumulation. The fire mitigation program 150 may control the UAV to perform the cloud seeding in the appropriate portions of the geographical area.

According to at least one further embodiment, the one or more mitigation actions may be executed in response to determining the threshold limit for the amount of accumulated inflammable material has been exceeded. For example, where the threshold limit for the amount of leaves that have accumulated is be two tons, the one or more mitigation actions may be executed in response to determining the amount of leaves that have accumulated exceeds two tons.

Referring now to FIG. 3, an exemplary diagram 300 depicting LEO satellites capturing images of a geographical area is shown according to at least one embodiment. In the diagram 300, a first set of LEO satellites 302 and a second set of LEO satellites 304 may be positioned within the boundary of a geographical area 306. For example, the geographical area may include portions of North America and South America. The first set of LEO satellites 302 and the second set of LEO satellites 304 may be capturing the live LEO satellite images of the inflammable material in the geographical area 306. In order to capture the live LEO satellite images, the configuration of the first set of LEO satellites 302 and the second set of LEO satellites 304 may be changed. For example, a zoom level of a camera of the first set of LEO satellites 302 that are monitoring South America may be changed. Continuing the example, a resolution of a camera of the second set of LEO satellites 304 may be changed.

It may be appreciated that FIGS. 2A, 2B, and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of predicting and mitigating forest fires based on low earth orbit (LEO) satellites, the method comprising:

receiving historical LEO satellite images of a forested region;

identifying a geographical area and a boundary of the geographical area based on the historical LEO satellite images;

identifying a time range of a fire season in the geographical area;

determining whether at least one LEO satellite is positioned within the boundary of the geographical area during the time range;

in response to determining the at least one LEO satellite is not positioned within the boundary of the geographical area during the time range, adapting a location of the at least one LEO satellite to be within the boundary during the time range;

capturing live LEO satellite images of inflammable material in the geographical area; and identifying a range of changes in the inflammable material by comparing the live LEO satellite images and the historical LEO satellite images, wherein identifying the range of changes in the inflammable material includes the at least one LEO satellite performing edge computation on the historical LEO satellite images and the live LEO satellite images to evaluate a rate at which a density of leaves on trees decreases from one time period to another.

2. The computer-based method of claim 1, wherein adapting the location of the at least one LEO satellite to be within the boundary during the time range further comprises:

adapting a configuration of the at least one LEO satellite including a zoom level and a resolution of a camera of the at least one LEO satellite.

3. The computer-based method of claim 1, further comprising:

predicting an amount of the inflammable material that has accumulated in the geographical area based on the comparison of the live LEO satellite images and the historical LEO satellite images;

predicting a fire propagation capability based on identified weather patterns in the geographical area during the time range;

creating a heat map of the accumulated inflammable material; and executing one or more mitigation actions to prevent fire propagation.

4. The computer-based method of claim 3, wherein predicting the fire propagation capability based on the identified weather patterns in the geographical area during the time range further comprises:

estimating a wind speed and direction in the geographical area during the time range; and predicting a direction of fire propagation based on the estimated wind speed and direction.

5. The computer-based method of claim 3, wherein the executed one or more mitigation actions include deploying a robotic device to remove the accumulated inflammable material.

6. The computer-based method of claim 5, wherein the robotic device is deployed to remove the accumulated inflammable material in descending order from a portion of the geographical area having greatest accumulation to a portion of the geographical area having least accumulation based on the heat map.

7. The computer-based method of claim 3, wherein the executed one or more mitigation actions include identifying an aerial location within the boundary of the geographical area where cloud seeding is to be performed based on the heat map.

8. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving historical LEO satellite images of a forested region;

identifying a geographical area and a boundary of the geographical area based on the historical LEO satellite images;

identifying a time range of a fire season in the geographical area;

determining whether at least one LEO satellite is positioned within the boundary of the geographical area during the time range;

in response to determining the at least one LEO satellite is not positioned within the boundary of the geographical area during the time range, adapting a location of the at least one LEO satellite to be within the boundary during the time range;

capturing live LEO satellite images of inflammable material in the geographical area; and identifying a range of changes in the inflammable material by comparing the live LEO satellite images and the historical LEO satellite images, wherein identifying the range of changes in the inflammable material includes the at least one LEO satellite performing edge computation on the historical LEO satellite images and the live LEO satellite images to evaluate a rate at which a density of leaves on trees decreases from one time period to another.

9. The computer system of claim 8, wherein adapting the location of the at least one LEO satellite to be within the boundary during the time range further comprises:

adapting a configuration of the at least one LEO satellite including a zoom level and a resolution of a camera of the at least one LEO satellite.

10. The computer system of claim 8, the method further comprising:

predicting an amount of the inflammable material that has accumulated in the geographical area based on the comparison of the live LEO satellite images and the historical LEO satellite images;

predicting a fire propagation capability based on identified weather patterns in the geographical area during the time range;

creating a heat map of the accumulated inflammable material; and executing one or more mitigation actions to prevent fire propagation.

11. The computer system of claim 10, wherein predicting the fire propagation capability based on the identified weather patterns in the geographical area during the time range further comprises:

estimating a wind speed and direction in the geographical area during the time range; and predicting a direction of fire propagation based on the estimated wind speed and direction.

12. The computer system of claim 10, wherein the executed one or more mitigation actions include deploying a robotic device to remove the accumulated inflammable material.

13. The computer system of claim 12, wherein the robotic device is deployed to remove the accumulated inflammable material in descending order from a portion of the geographical area having greatest accumulation to a portion of the geographical area having least accumulation based on the heat map.

14. The computer system of claim 10, wherein the executed one or more mitigation actions include identifying an aerial location within the boundary of the geographical area where cloud seeding is to be performed based on the heat map.

15. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving historical LEO satellite images of a forested region;

identifying a geographical area and a boundary of the geographical area based on the historical LEO satellite images;

identifying a time range of a fire season in the geographical area;

determining whether at least one LEO satellite is positioned within the boundary of the geographical area during the time range;

in response to determining the at least one LEO satellite is not positioned within the boundary of the geographical area during the time range, adapting a location of the at least one LEO satellite to be within the boundary during the time range;

capturing live LEO satellite images of inflammable material in the geographical area; and identifying a range of changes in the inflammable material by comparing the live LEO satellite images and the historical LEO satellite images, wherein identifying the range of changes in the inflammable material includes the at least one LEO satellite performing edge computation on the historical LEO satellite images and the live LEO satellite images to evaluate a rate at which a density of leaves on trees decreases from one time period to another.

16. The computer program product of claim 15, wherein adapting the location of the at least one LEO satellite to be within the boundary during the time range further comprises:

adapting a configuration of the at least one LEO satellite including a zoom level and a resolution of a camera of the at least one LEO satellite.

17. The computer program product of claim 15, the method further comprising:

predicting an amount of the inflammable material that has accumulated in the geographical area based on the comparison of the live LEO satellite images and the historical LEO satellite images;

predicting a fire propagation capability based on identified weather patterns in the geographical area during the time range;

creating a heat map of the accumulated inflammable material; and executing one or more mitigation actions to prevent fire propagation.

18. The computer program product of claim 17, wherein predicting the fire propagation capability based on the identified weather patterns in the geographical area during the time range further comprises:

estimating a wind speed and direction in the geographical area during the time range; and predicting a direction of fire propagation based on the estimated wind speed and direction.

19. The computer program product of claim 17, wherein the executed one or more mitigation actions include deploying a robotic device to remove the accumulated inflammable material.

20. The computer program product of claim 19, wherein the robotic device is deployed to remove the accumulated inflammable material in descending order from a portion of the geographical area having greatest accumulation to a portion of the geographical area having least accumulation based on the heat map.

* * * * *